US010855873B2

(12) United States Patent
Fujii et al.

(10) Patent No.: US 10,855,873 B2
(45) Date of Patent: Dec. 1, 2020

(54) IMAGE FORMING APPARATUS

(71) Applicants: Tomoya Fujii, Kanagawa (JP); Takayuki Andoh, Kanagawa (JP); Masatoshi Ishida, Kanagawa (JP); Yohei Osanai, Kanagawa (JP); Satoshi Narai, Kanagawa (JP); Kunihiko Nishioka, Kanagawa (JP); Masashi Ota, Kanagawa (JP)

(72) Inventors: Tomoya Fujii, Kanagawa (JP); Takayuki Andoh, Kanagawa (JP); Masatoshi Ishida, Kanagawa (JP); Yohei Osanai, Kanagawa (JP); Satoshi Narai, Kanagawa (JP); Kunihiko Nishioka, Kanagawa (JP); Masashi Ota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/436,154

(22) Filed: Jun. 10, 2019

(65) Prior Publication Data
US 2020/0084333 A1 Mar. 12, 2020

(30) Foreign Application Priority Data
Sep. 10, 2018 (JP) ................................. 2018-169101

(51) Int. Cl.
*H04N 1/04* (2006.01)
*H04N 1/107* (2006.01)
*H04N 1/00* (2006.01)

(52) U.S. Cl.
CPC ....... *H04N 1/1075* (2013.01); *H04N 1/00018* (2013.01); *H04N 1/00541* (2013.01); *H04N 1/00551* (2013.01); *H04N 1/1077* (2013.01)

(58) Field of Classification Search
CPC ............ H04N 1/1075; H04N 1/00018; H04N 1/00541; H04N 1/00551; H04N 1/1077
(Continued)

(56) References Cited

U.S. PATENT DOCUMENTS 6,357,939 B1 * 3/2002 Baron ........................ B41J 3/36
400/61
7,355,410 B2 * 4/2008 Schmitzer ................ G01V 3/15
324/235
(Continued)

FOREIGN PATENT DOCUMENTS

EP 3539786 A1 9/2019
EP 3539787 A1 9/2019
(Continued)

OTHER PUBLICATIONS

Extended European Search Report dated Oct. 24, 2019, issued in corresponding European Application No. 19178516.1.
(Continued)

*Primary Examiner* — Cheukfan Lee
(74) *Attorney, Agent, or Firm* — Harness, Dickey and Pierce, P.L.C.

(57) ABSTRACT

An image forming apparatus includes a body, an image forming device configured to form an image on a recording medium and supported by the body, an attachment configured to be removably attached to the body, and a cover configured to be removably attached to the body. The cover is configured to cover the attachment attached to the body. The attachment is configured to switch a state in use of the image forming apparatus by attaching and removing of the attachment to and from the body.

15 Claims, 11 Drawing Sheets

(58) Field of Classification Search
USPC .............. 358/1.1, 472, 473; 382/313, 312
See application file for complete search history.

(56) References Cited

U.S. PATENT DOCUMENTS

| | | | |
|---|---|---|---|
| 2003/0067634 A1* | 4/2003 | Payne | H04N 1/00551 |
| | | | 358/474 |
| 2009/0162082 A1 | 6/2009 | Shiraki et al. | |
| 2012/0062685 A1 | 3/2012 | Serizawa et al. | |
| 2012/0300007 A1 | 11/2012 | Fujii et al. | |
| 2013/0188004 A1 | 7/2013 | Arai et al. | |
| 2013/0194370 A1 | 8/2013 | Sakaue et al. | |
| 2014/0369046 A1 | 12/2014 | Andoh | |
| 2016/0352955 A1 | 12/2016 | Ishida et al. | |
| 2018/0170080 A1* | 6/2018 | Suzuki | B41J 2/2135 |
| 2018/0361761 A1* | 12/2018 | Okeguchi | B41J 2/01 |
| 2019/0283452 A1* | 9/2019 | Nishii | B41J 2/01 |
| 2019/0283453 A1* | 9/2019 | Nishii | B41J 29/38 |
| 2019/0283467 A1* | 9/2019 | Nishii | B41J 29/02 |
| 2020/0079112 A1* | 3/2020 | Osanai | B41J 2/17553 |
| 2020/0096897 A1* | 3/2020 | Ota | G03G 15/0409 |

FOREIGN PATENT DOCUMENTS

| | | |
|---|---|---|
| EP | 3539788 A1 | 9/2019 |
| JP | H01309562 A | 12/1989 |
| JP | 5-116380 | 5/1993 |
| KR | 101865665 B1 | 6/2018 |

OTHER PUBLICATIONS

U.S. Appl. No. 16/215,990, filed Dec. 11, 2018, Toshikane Nishii, et al.
U.S. Appl. No. 16/233,522, filed Dec. 27, 2018, Toshikane Nishii, et al.
U.S. Appl. No. 16/243,423, filed Jan. 9, 2019, Toshikane Nishii, et al.

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2018-169101, filed on Sep. 10, 2018, in the Japan Patent Office, the entire disclosure of which is hereby incorporated by reference herein.

BACKGROUND

Technical Field

This disclosure relates to an image forming apparatus.

Description of the Related Art

A handheld recording apparatus is to be moved by a user with a hand in a scanning direction for image formation (i.e., manual scanning). For example, the handheld recording apparatus is provided with a guide roller to guide the apparatus to move in the scanning direction.

SUMMARY

According to an embodiment of this disclosure, an image forming apparatus includes a body, an image forming device configured to form an image on a recording medium and supported by the body, an attachment configured to be removably attached to the body, and a cover configured to be removably attached to the body in a state in which the attachment attached to the body is covered. The attachment is configured to switch a state in use of the image forming apparatus by attaching and removing of the attachment to and from the body.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
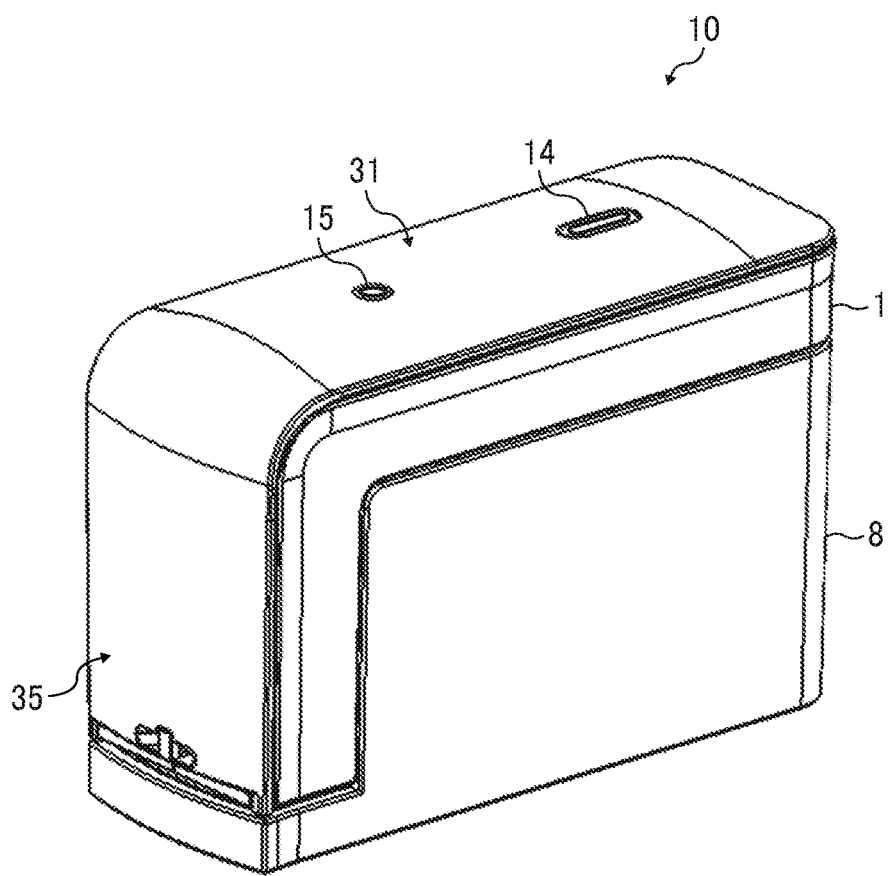
FIG. 1 is an exterior perspective view illustrating a handheld printer as viewed from above obliquely according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image forming apparatus according to an embodiment of this disclosure is described. As used herein, the singular forms "a", "an", and "the" are intended to include the plural forms as well, unless the context clearly indicates otherwise.

Descriptions are given below of a handheld mobile inkjet printer (hereinafter simply referred to as "handheld printer") that is a mobile image forming apparatus, according to an embodiment of the present disclosure.

First, a basic configuration of a printer body of the handheld printer according to the present embodiment is described.

FIG. 1 is a perspective view illustrating an exterior of a handheld printer 10 according to the present embodiment, as viewed from obliquely above.

Figure 2:
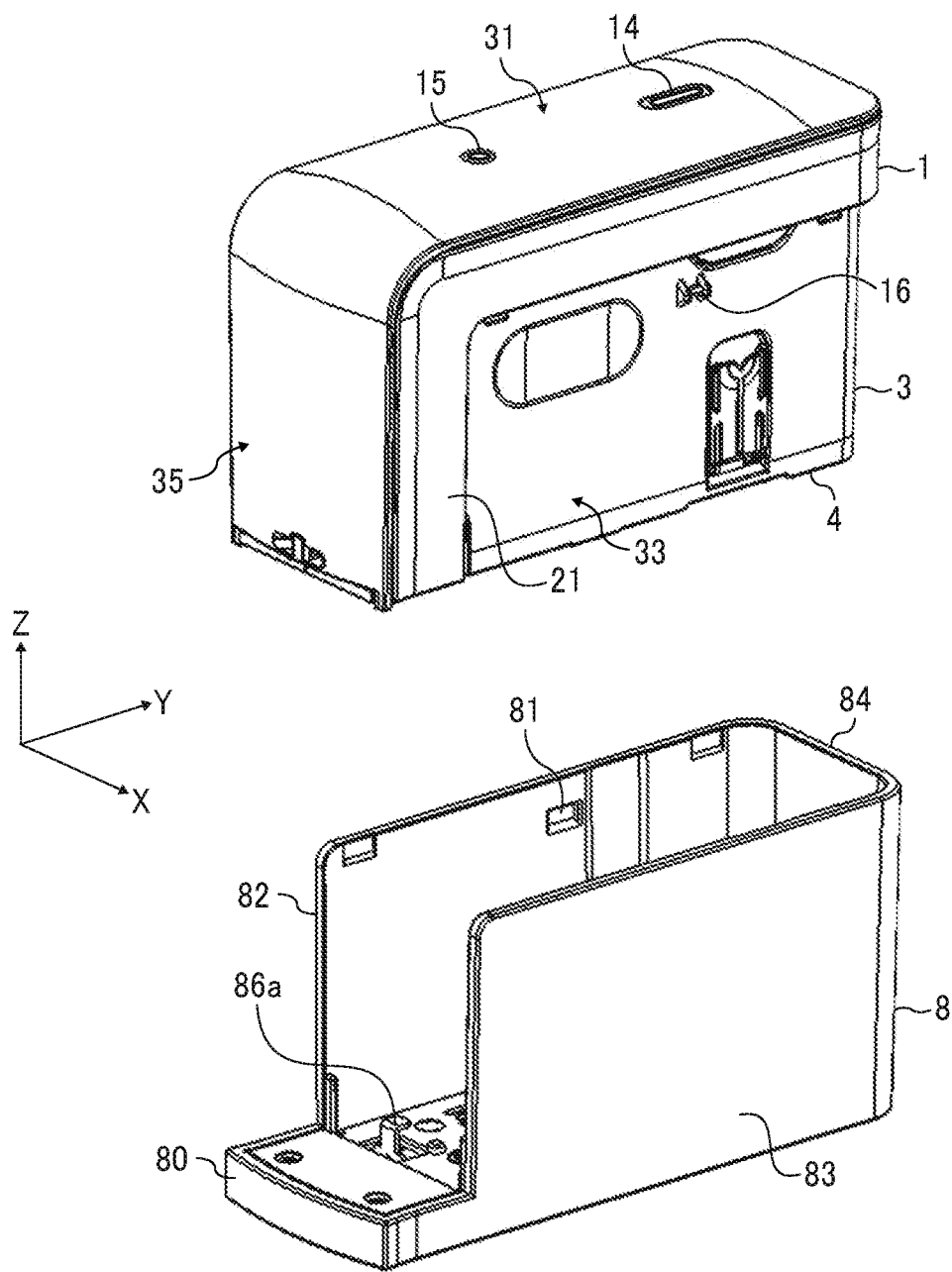
FIG. 2 is an exterior perspective view of a printer body of the handheld printer illustrated in FIG. 1, in a state in which a cover is removed from the printer body.

FIG. 2 is an exterior perspective view of the printer body 1 in which a cover 8 is removed from the printer body 1. The printer body 1 is an apparatus body of the handheld printer 10.

The handheld printer 10 according to the present embodiment includes the printer body 1, a spacer 4 serving as an attachment to be removably attached to the printer body 1, and a cover 8. The cover is attached to the printer body 1 with the spacer 4 housed in the cover 8. The cover 8 is made of resin such as acrylonitrile butadiene styrene (ABS) resin, and recesses 81 are formed on the inner wall surface thereof. When the cover 8 is attached to the printer body 1, two projections 16 (one of the two is illustrated in FIG. 2) provided on the printer body 1 are respectively hooked to two recesses 81 (one of the two is illustrated in FIG. 2) provided on the cover 8 by snap-fit. Thereby, the state in which the cover 8 is attached to the printer body 1 is held. When removing the cover 8 from the printer body 1, the user pulls the printer body 1 out of the cover 8 so that the projections 16 caught by the snap-fit are removed from the recesses 81 and the user can remove the cover 8 from the printer body 1.

Figure 3:
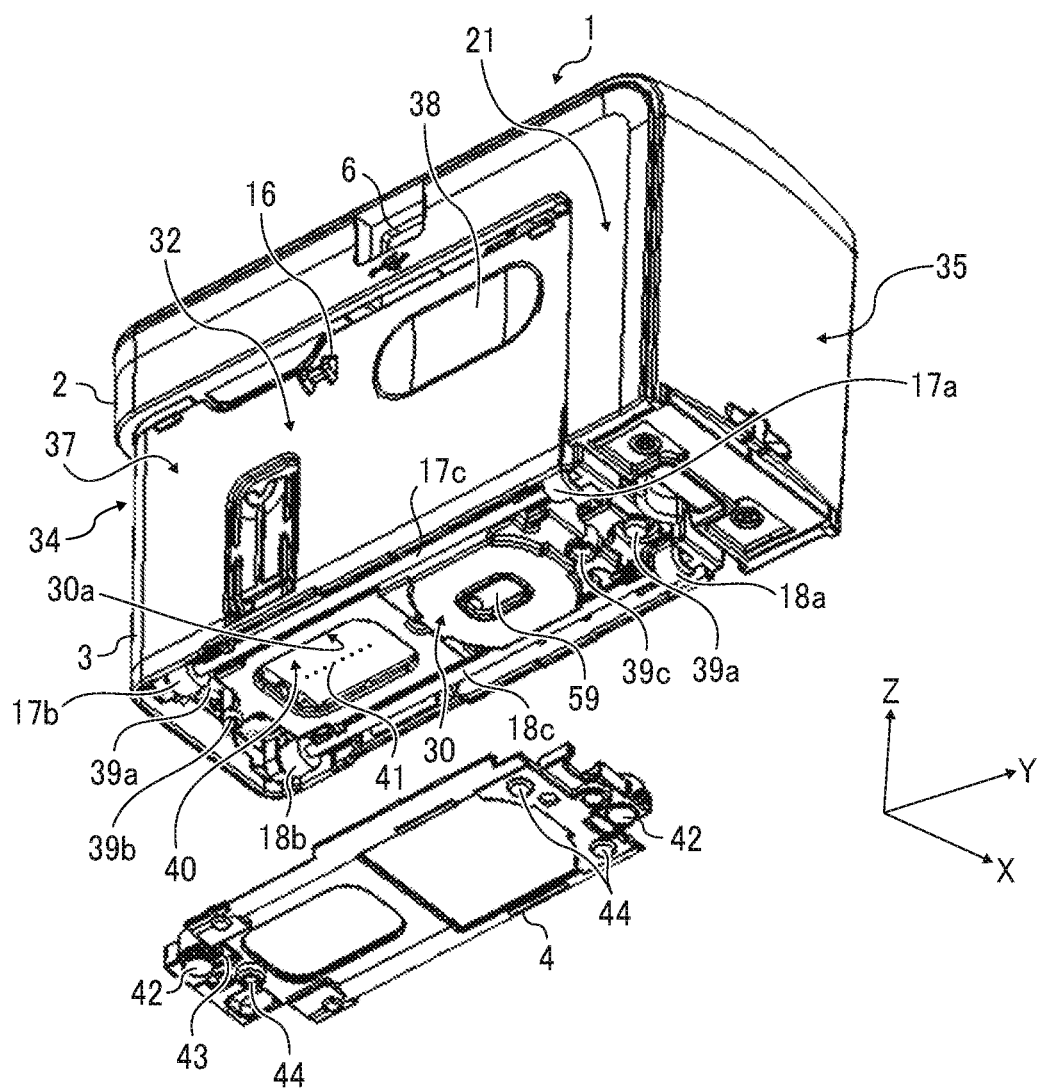
FIG. 3 is an exterior perspective view of the printer body in a state in which a spacer is detached, as viewed obliquely from below.

FIG. 3 is an exterior perspective view of the printer body 1 and the spacer 4 removed from the printer body 1, as viewed obliquely from below.

The printer body 1 illustrated in FIG. 3 includes an upper unit 2 and a lower unit 3. The printer body 1 as a whole is shaped like a rectangular parallelepiped. In a scanning direction, that is, a printing direction indicated by arrow X in FIG. 2 (X-axis direction), the printer body 1 has such a length that a user can grasp the printer body 1 with a palm.

The housing of the printer body 1 includes a recording side 30 on which a recording portion (an image forming device) of an inkjet head (described later) is disposed opposed to a recording medium such as a paper sheet, an upper side 31 opposite the recording side 30, a left side 32 extending in a direction indicated by arrow Y (hereinafter also referred to as "scanning orthogonal direction"), orthogonal to a scanning direction (indicated by arrow X). The housing further includes, for example, a right side 33 extending in the direction orthogonal to the scanning direction, a rear side 34 extending in the scanning direction (indicated by arrow X), and a front side 35 extending in the scanning direction. The printer body 1 is usually used in such a posture that the recording side 30 is faced vertically down and the upper side 31, which is opposite the recording side 30, is faced vertical up.

A print button 14 and a power button 15 are disposed on the upper side 31. The left side 32 of the upper unit 2 includes a universal serial bus (USB) connection port 6. The USB connection port 6 is a port for connecting a USB cable. The printer body 1 is provided with a rechargeable battery mounted therein. The rechargeable battery can be charged when electric power is supplied thereto from an external power supply via the USB cable connected to the USB connection port 6.

A wide portion 21 of the upper unit 2 connects to the front side 35 of the lower unit 3. The wide portion 21 has a wider width than a narrow portion 37 of the lower unit 3. On the left and right sides 32 and 33 of the narrow portion 37 of the lower unit 3, finger-grip portions 38 are formed at the positions where the user applies the fingers (usually the thumb and one of the middle finger and the ring finger) of the hand, respectively, while gripping and using the printer body 1. When the user moves the printer body 1 on a surface of the recording medium in the scanning direction (X-axis direction) for image formation, the user holds the finger-grip portions 38 on the left and right sides 32 and 33, positioning the wide portion 21 closer to the wrist, to sandwich the lower unit 3 with the fingers to hold the printer body 1.

The wide portion 21 is made wider than the narrow portion 37 in the scanning orthogonal direction so that the outer wall surface of the wide portion 21 and the outer wall surface of the cover 8 are on a substantially identical plane when the cover 8 is attached to the printer body 1, as illustrated in FIG. 1.

Figure 4:
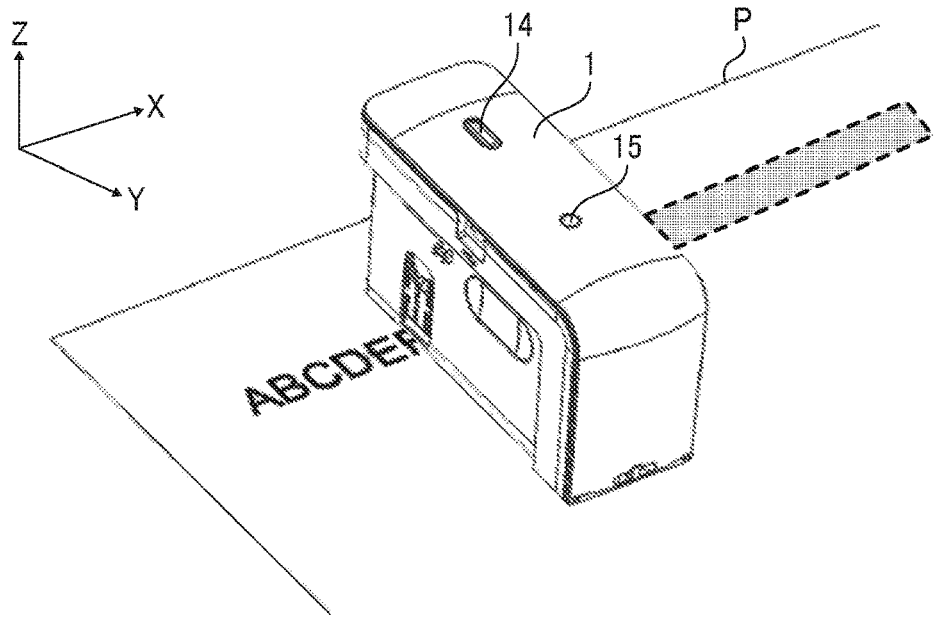
FIG. 4 is a perspective view of the printer body in a state in which a printed image is being formed on a recording medium.

The user can switch on and off the power of the printer body 1 by holding down the power button 15. When the power is turned on, a control board provided in the upper unit 2 of the printer body 1 can acquire image data by wireless communication with a smartphone or the like. After the user places the printer body 1 on the surface of a recording medium P with the recording side 30 facing the surface of the recording medium P, the user presses the print button 14 once and moves the printer body 1 in the scanning direction (in X-axis direction) as illustrated in FIG. 4, thus forming an image on the recording medium P. The printer body 1 can form an image on the surface of the recording medium in both of forward movement and backward movement in the scanning direction (manual scanning) when the user moves the printer body 1 back and forth.

The recording medium P is not limited to paper, such as paper sheets, but includes any other image formation targets, for example, overhead projector (OHP) sheets, cloth, cardboards, packaging containers, glass, and substrates.

The upper unit 2 is held by the lower unit 3 to open and close with respect to the lower unit 3. The inkjet head 40, the ink cartridge which includes the recording portion and an ink tank combined into a single unit, is mounted inside the lower unit 3. At this time, the recording portion to discharge ink droplets is faced down in the vertical direction. The inkjet head 40 discharges ink droplets from the recording portion to record an image on a recording medium.

As illustrated in FIG. 3, the recording side 30 of the printer body 1 includes an opening 30a to expose the recording portion of the inkjet head 40 mounted in the lower unit 3 to the outside. The recording portion of the inkjet head 40 includes a plurality of discharge nozzles 41 and is capable of discharging ink droplets separately from the respective discharge nozzles 41 as piezoelectric elements are driven.

As a driving source to discharge ink, the inkjet head 40 employs, for example, an electromechanical transducer element (piezoelectric actuators) including a lamination-type piezoelectric element or a thin-film-type piezoelectric element; an electrothermal transducer element, such as a heat element; or an electrostatic actuator including a diaphragm and opposed electrodes.

The "ink (liquid)" discharged from the discharge nozzles 41 of the recording portion is not particularly limited as long as the liquid has a viscosity and a surface tension that enable discharge from the discharge nozzles 41. However, it is preferable that the viscosity is 30 mPa·s or less under ordinary temperature and pressure or by heating or cooling. Specifically, the term "liquid" represents, for example, a solution, a suspension, or an emulsion including a solvent, such as water or organic solvent, a colorant, such as a dye or a pigment, a polymerizable compound, a resin, a functional material, such as a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, surface treatment liquid, a liquid for forming components of electronic element or light-emitting element or a resist pattern of electronic circuit, or a material solution for three-dimensional fabrication.

Inside the outer edge of the recording side 30, a position sensor 59 as a detector to detect the position of the printer body 1 on the recording medium, a first left roller 17a, a second left roller 17b, a first right roller 18a, and a second right roller 18b that are rotatable are disposed.

When the user moves the printer body 1 in the scanning direction, the four rollers contacting the surface of the recording medium P rotate like tires. Owing to such rollers, the user can move forward or backward the printer body 1 straight in the scanning direction. At this time, only the four rollers of the printer body 1 are in contact with the surface of the recording medium and keep the distance between the recording side 30 and the surface of the recording medium at a predetermined separation distance. Therefore, a constant distance can be maintained between the recording portion of the inkjet head 40 and the surface of the recording medium, thus forming a desired high-quality image.

The position sensor 59 is a sensor to detect the distance to the surface of the recording medium, the surface state (for example, asperities) of the recording medium, and the distance by which the printer body 1 has traveled. The position sensor 59 is similar to a sensor used for, for example, an optical mouse (a pointing device) of a personal computer. The position sensor 59 irradiates, with light, a place (recording medium) where the printer body 1 is placed and reads the state of the place as a "pattern". The position sensor 59 sequentially detects how the "pattern" moves relative to the movement of the position sensor 59, to calculate the amount of movement.

Figure 5:
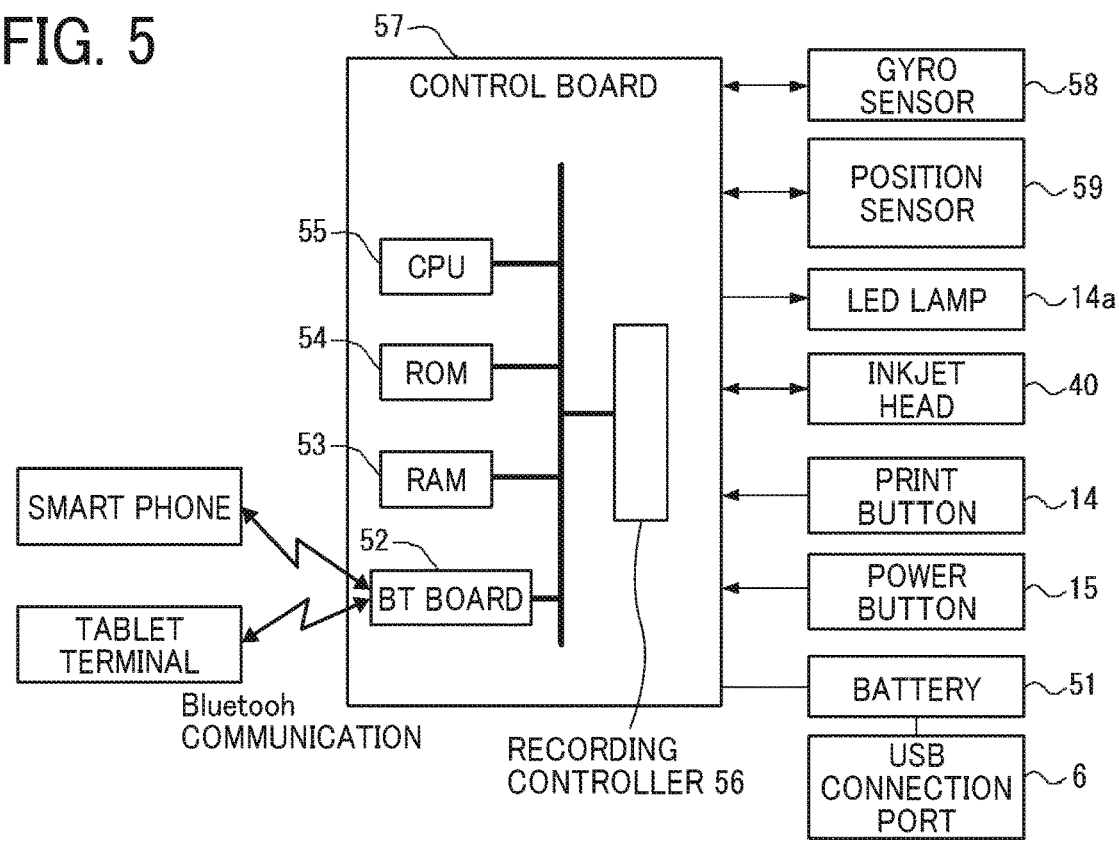
FIG. 5 is a block diagram illustrating a part of an electric circuit of the printer body.

FIG. 5 is a block diagram illustrating a portion of an electric circuit of the printer body 1.

A control board 57 includes a central processing unit (CPU) 55 that performs various arithmetic processing and program execution, a Bluetooth (registered trademark, hereinafter "BT") board 52 for short-range wireless communication, a random access memory (RAM) 53 that temporarily stores data, a read-only memory (ROM) 54, and a recording controller 56. The control board 57 is secured at a position on the back side of the USB connection port 6 in a hollow space of the upper unit 2.

The BT board 52 performs data communication by short-range wireless communication (Bluetooth communication) with an external device, such as a smartphone or a tablet terminal. The ROM 54 stores, for example, firmware for hardware control of the printer body 1 and drive waveform data of the inkjet head 40. The recording controller 56 executes data processing for driving the inkjet head 40 and generates drive waveforms.

The control board 57 is electrically connected to a gyro sensor 58, the position sensor 59, a light emitting diode (LED) lamp 14a, the inkjet head 40, the print button 14, the power button 15, the battery 51, and the like.

The gyro sensor 58 detects the tilt and the rotation angle of the printer body 1 and transmits the detection result to the control board 57. The LED lamp 14a is disposed inside an exterior cover, made of a light transmissive material, of the print button 14 and makes the print button 14 luminous.

When the power button 15 is pressed to turn on the power of the printer body 1, power is supplied to each module. The CPU 55 initiates startup according to the program stored in the ROM 54 and loads the program and each data in the RAM 53. When data of an image to be formed is received from an external device by short-range wireless communication, the recording controller 56 generates a drive waveform corresponding to the image data. Then, the discharge of ink from the inkjet head 40 is controlled to form an image corresponding to the position on the surface of the recording medium detected by the position sensor 59.

During acquisition of image data via short-range wireless communication from an external device, the control board 57 causes the LED lamp 14a to blink so that the light transmissive print button 14, which transmits light, becomes luminous and blinks. Then, after the acquisition of the image data completes, the control board 57 causes the LED lamp 14a to keep emitting light so that the print button 14 continuously emits light. Seeing such light emission, the user knows the completion of the acquisition of the image data. Then, the user places the printer body 1 on the recording medium and presses the print button 14.

Meanwhile, as the control board 57 starts blinking of the LED lamp 14a, the control board 57 waits for pressing of the print button 14. When the print button 14 is pressed, the control board 57 causes the LED lamp 14a to blink so that the print button 14 becomes luminous and blinks. Seeing such blinking, the user starts moving the printer body 1 in the scanning direction (manual scanning).

Finishing moving (manual scanning) of the printer body 1, the user presses the print button 14 again. With such an operation, the control board 57 turns off the LED lamp 14a and stops lighting of the print button 14. Or, there may be a case where the user does not press the print button 14 but picks up the printer body 1 from the recording medium and places the printer body 1 on, for example, a table or mounts the printer body 1 in the cover 8. In this case, at the timing when the user picks up the printer body 1 from the recording medium, the position sensor 59 no longer detects the position. At the timing when the position sensor 59 stops detecting the position, the control board 57 turns off the LED lamp 14a and stops lighting of the print button 14.

It is not necessary to keep pushing the print button 14 while the user moves (manual scanning) the printer body 1. Once the print button 14 is pushed and released before the moving of the printer body 1, the image forming operation based on the detection result by the position sensor 59 is continued until the end of the image formation, the print button 14 is pushed again, or the end of the position detection by the position sensor 59.

Figure 6:
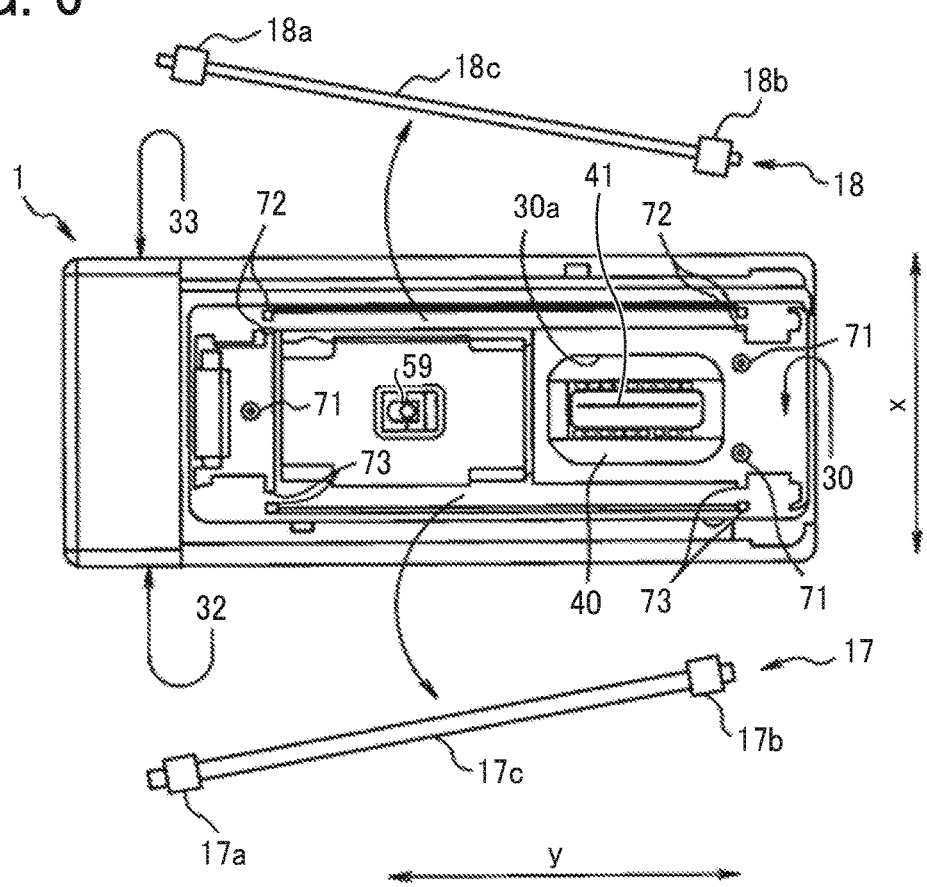
FIG. 6 is a bottom view illustrating the printer body from which right and left roller units are removed.

FIG. 6 is a bottom view illustrating the printer body 1 from which roller units are removed.

The printer body 1 includes a left roller unit 17 and a right roller unit 18. The left roller unit 17 is attached to an end on the side of the left side 32 in the scanning direction (indicated by arrow X) of the printer body 1. The right roller unit 18 is attached to an end on the side of the right side 33 in the scanning direction of the printer body 1.

The left roller unit 17 includes a metal shaft 17c, the first left roller 17a secured to one end side in the longitudinal direction of the shaft 17c, and the second left roller 17b secured to the other end side of the shaft 17c. Each of the first left roller 17a and the second left roller 17b is made of a material, such as rubber, having a relatively large frictional resistance.

The right roller unit 18 includes a metal shaft 18c, the first right roller 18a secured to one end side in the longitudinal direction of the shaft 18c, and the second right roller 18b secured to the other end side of the shaft 18c. Each of the first right roller 18a and the second right roller 18b is made of a material, such as rubber, having a relatively large frictional resistance.

As end portions in the longitudinal direction of the shaft 17c are fitted in sliding bearings 73 fixed to the printer body 1, the left roller unit 17 is rotatably held by the sliding bearings 73. The sliding bearing 73 includes a cutout portion in the circumferential direction, and the shaft 17c is inserted into the bearing through the cutout portion. At this time, the sliding bearing 73 is temporarily deformed by the force pushing in the shaft 17c so that the width of the cutout portion, which is smaller than the diameter of the shaft 17c in a normal state, is expanded to be approximately equal to the diameter of the shaft 17c. When the shaft 17c is fully pushed in the sliding bearing 73, the deformation of the sliding bearing 73 is canceled, and the width of the cutout portion becomes smaller than the diameter of the shaft 17c. As a result, the left roller unit 17 is rotatably held by the sliding bearing 73.

Similar to the left roller unit 17, the right roller unit 18 is rotatably held by sliding bearings 72 fixed to the printer body 1.

The left roller unit 17 and the right roller unit 18 are for enhancing the straight traveling performance of the printer body 1 in the scanning direction (indicated by arrow X). While the first left roller 17a and the second left roller 17b secured to the shaft 17c rotate together as one unit, the first right roller 18a and the second right roller 18b secured to the shaft 18c rotate together as one unit, thus improving the straight traveling performance.

More specifically, the first roller 17a and the second roller 17b of the left roller unit 17 rotate as one unit on the same axis. Such a structure can prevent the first and second rollers 17a and 17b from rotating at different linear speeds and rotating in the opposite directions from each other. Assume that a force in a direction deviating from the scanning direction, in addition to the force in the scanning direction, is applied to the printer body 1 while the user moves the printer body 1 provided with the left roller unit 17 in the scanning direction. The latter force (force in the direction deviating from the scanning direction) urges the first and second rollers 17a and 17b to rotate at different linear speeds. However, the two rollers 17a and 17b rotating as one unit do not rotate in such a manner. Since the two rollers rotate in the same direction and at the same linear speed, the printer body 1 follows the force in the scanning direction and travels straight in the scanning direction. Therefore, the user can easily move the printer body 1 straight in the scanning direction.

Although the description above concerns how the left roller unit 17 enhances the straight traveling performance of the printer body 1, the right roller unit 18 enhances the straight traveling performance of the printer body 1 similarly. Even if the first and second rollers 17a and 17b of the left roller unit 17 are rotated independently of each other, the straight traveling performance can be improved to some extent by the rollers. Hereinafter the first and second rollers 17a and 17b may be collectively referred to as "rollers 17a and 17b", and the first and second rollers 18a and 18b may be collectively referred to as "rollers 18a and 18b" when discriminations therebetween is not necessary. Therefore, rotating the two rollers 17a and 17b together as one unit is not a requisite, and the two rollers can be rotated independently of each other. The same applies to the roller unit 18. However, rotating two rollers as one unit is advantageous in better improving the straight traveling performance.

In the printer body 1 according to the present embodiment, the rollers 17a and 17b of the left roller unit 17 and the rollers 18a and 18b of the right roller unit 18 are disposed at positions deviating from the recording portion in the orthogonal direction (indicated by arrow Y) to the scanning direction. In such an arrangement, when the printer body 1 is moved, the rollers 17a, 17b, 18a, and 18b are inhibited from contacting an image portion immediately after formed. Therefore, the image can be protected from being disturbed by the rollers 17a, 17b, 18a, and 18b contacting the image portion.

As the distance between the two rollers 17a and 17b in the rotation axis direction increases, the roller unit 17 can enhance the straight traveling performance of the printer body 1. The same applies to the roller unit 18. Therefore, in the printer body 1 according to the present embodiment, the first rollers 17a and 18a are disposed at a position deviated from the recording portion toward the one end side (toward the front side 35) in the direction orthogonal to the scanning direction. In addition, the second rollers 17b and 18b are disposed at a position deviated from the recording portion toward the other end side (toward the rear side 34). In such a structure, compared with a structure in which two rollers are disposed together at one end side or the other end side, the distance in the direction between the two rollers in the direction orthogonal to the scanning direction is greater, thereby improving the straight traveling performance of the printer body 1.

As described above, the shafts 17c and 18c as rotation shafts of the roller units 17 and 18 are made of metal. Compared with a structure using a nonmetallic shaft, use of the metal shaft is advantageous in suppressing bend of the shaft during moving of the printer body 1, thereby inhibiting the image from being disturbed by unstable traveling of the printer body 1 due to the flexure of the shaft. Further, the printer body 1 can be compact when a shaft having a small diameter is used.

The printer body 1 according to the present embodiment includes, not only the left roller unit 17, but also the right roller unit 18 disposed on the side of the left roller unit 17 in the scanning direction. In such a configuration, the two roller units 17 and 18 resist the forces deviating from the scanning direction at different positions in the scanning direction. Accordingly, the straight traveling performance of the printer body 1 can be further enhanced.

Figure 7:
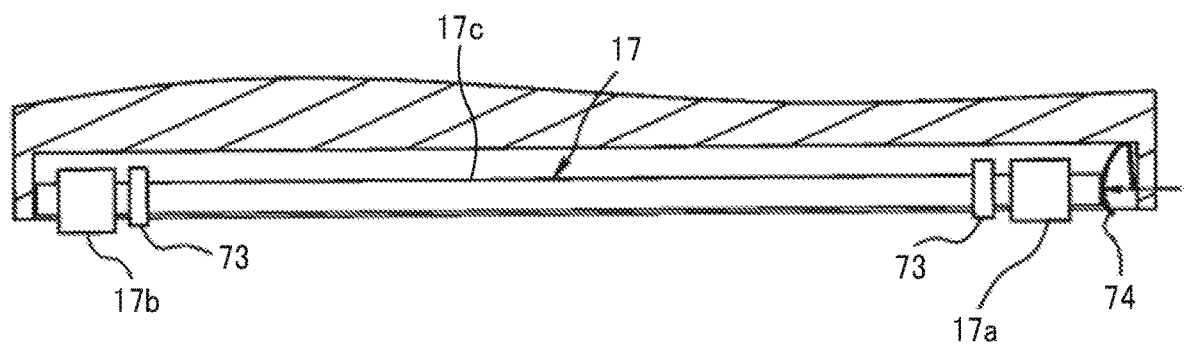
FIG. 7 is a partial cross-sectional view of a lower unit of the printer body, with the left roller unit attached thereto.

FIG. 7 is a partial cross-sectional view of the lower unit 3 of the printer body 1, with the left roller unit 17 attached thereto.

A pressing flat spring 74 is attached to a wall of the lower unit 3. For example, the pressing flat spring 74 is fixed thereto. The pressing flat spring 74 presses one longitudinal end of the shaft 17c of the left roller unit 17 toward the other end side in the axial direction so that the other longitudinal end of the shaft 17c is pressed against an inner wall of the casing of the lower unit 3.

In this manner, the shaft 17c of the left roller unit 17 is pressed in the axial direction by the pressing flat spring 74 to suppress the backlash of the first roller 17a and the second roller 17b in the axial direction (eliminate space allowing backlash). Accordingly, disturbance of the image due to the rattling can be suppressed.

Although the description above concerns pressing the shaft 17c of the left roller unit 17 in the axial direction with the pressing flat spring 74, the shaft 18c of the right roller unit 18 is similarly pressed in the axial direction by a pressing flat spring.

Instead of attaching the pressing flat springs to the casing, the pressing flat springs can be attached to the end portions of the shafts 17c and 18c of the roller units 17 and 18. The pressing flat spring can be fixed thereto. Such a configuration can obviate a process of attaching the pressing flat spring to the casing, thereby reducing the cost for assembling.

Here, in the configuration provided with the rollers 17a, 17b, 18a, and 18b like the printer body 1 according to the present embodiment, as described above, when the user moves the printer body 1 in the scanning direction (manual scanning), the straight traveling performance is secured. However, the rollers 17a, 17b, 18a, and 18b inhibit smooth traveling when the printer body 1 is moved along a curved track, thus inhibit smooth manual scanning.

In addition, when recording on the second line is performed after recording on the first line, a line feed operation is required to move the printer body 1 in the scanning orthogonal direction with the recording side 30 kept facing the surface of the recording medium so that position detection by the position sensor 59 is not disabled. Also in the line feed operation, the rollers 17a, 17b, 18a, and 18b of the printer body 1 may inhibit the movement in the scanning orthogonal direction and become a hindrance to a smooth line feed operation.

Therefore, the handheld printer 10 of the present embodiment is provided with the spacer 4 attachable to and removable from the recording side 30 of the printer body 1, and the usage form of the handheld printer 10 can be switched by attaching and removing the spacer 4. Specifically, the usage form can be switched between: a roller contact state in which scanning is performed while the rollers 17a, 17b, 18a, and 18b are in contact with the surface of the table on which the recording medium P is placed or the surface of the recording medium P (see FIG. 8); and a roller contactless state in which the rollers 17a, 17b, 18a, and 18b are not in contact with the surface of the table on which the recording medium P is placed or the surface of the recording medium P (see FIG. 9).

Figure 10:
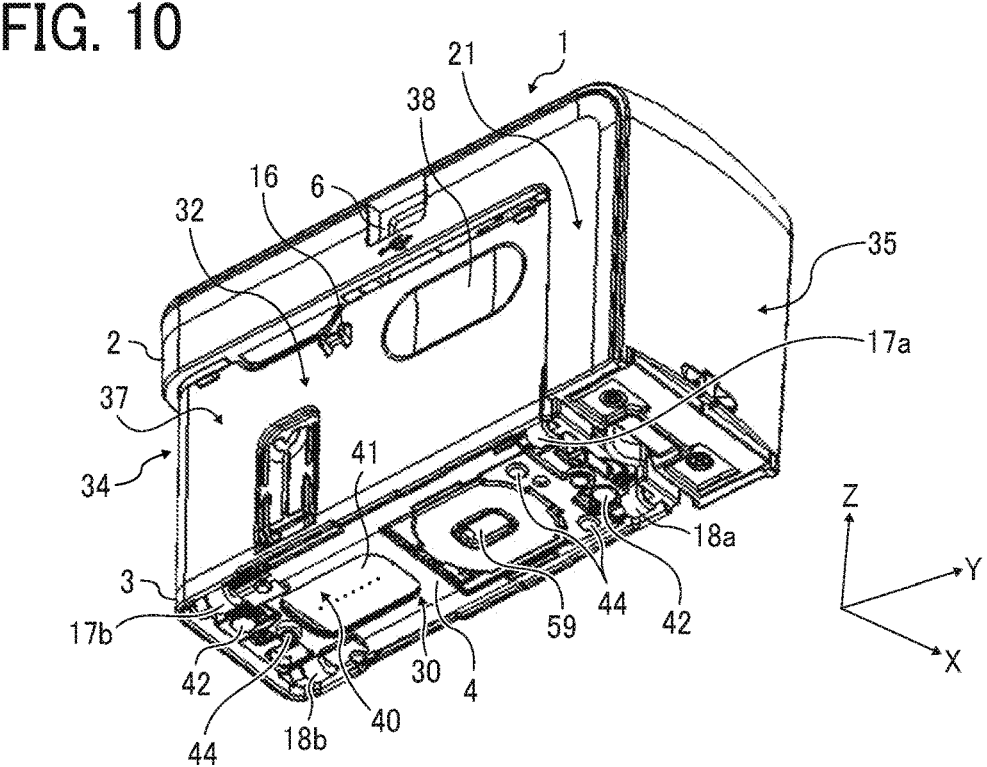
FIG. 10 is an exterior perspective view of the printer body in a state in which the spacer is attached thereto, as viewed obliquely from below.

FIG. 10 is an exterior perspective view of the printer body 1 in a state in which the spacer 4 is attached thereto, as viewed obliquely from below.

Figure 8:
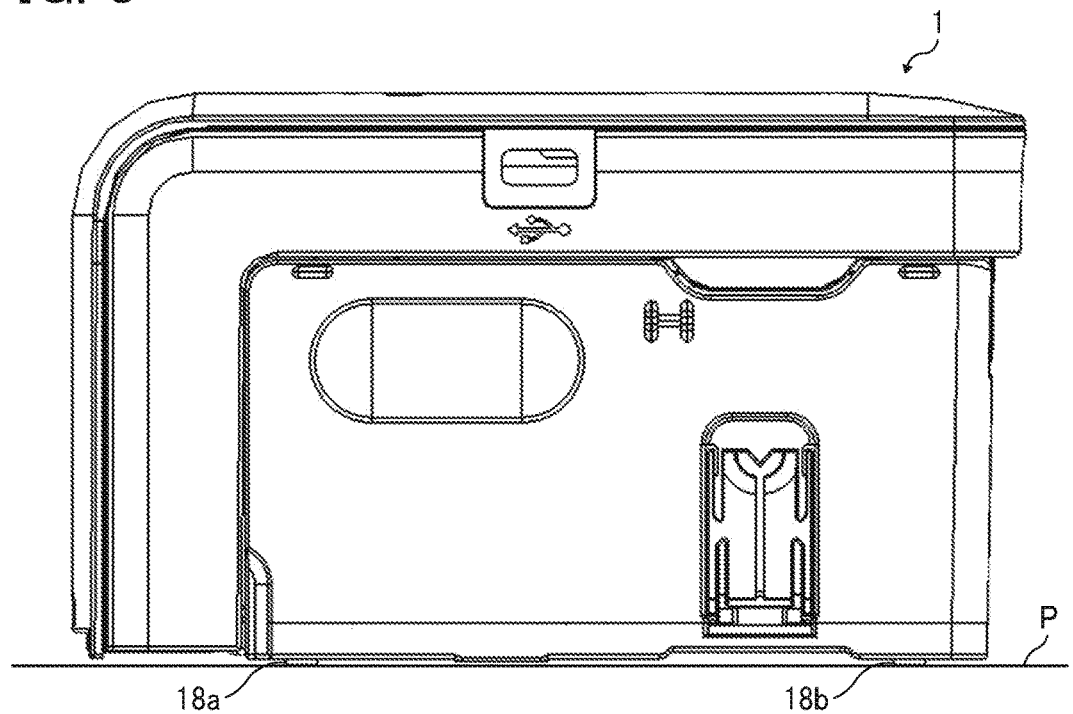
FIG. 8 is a right side view of the printer body being a roller contact state in which the printer body without the spacer is moved for scanning with rollers rolling on a recording medium or a table on which the recording medium is placed.
Figure 9:
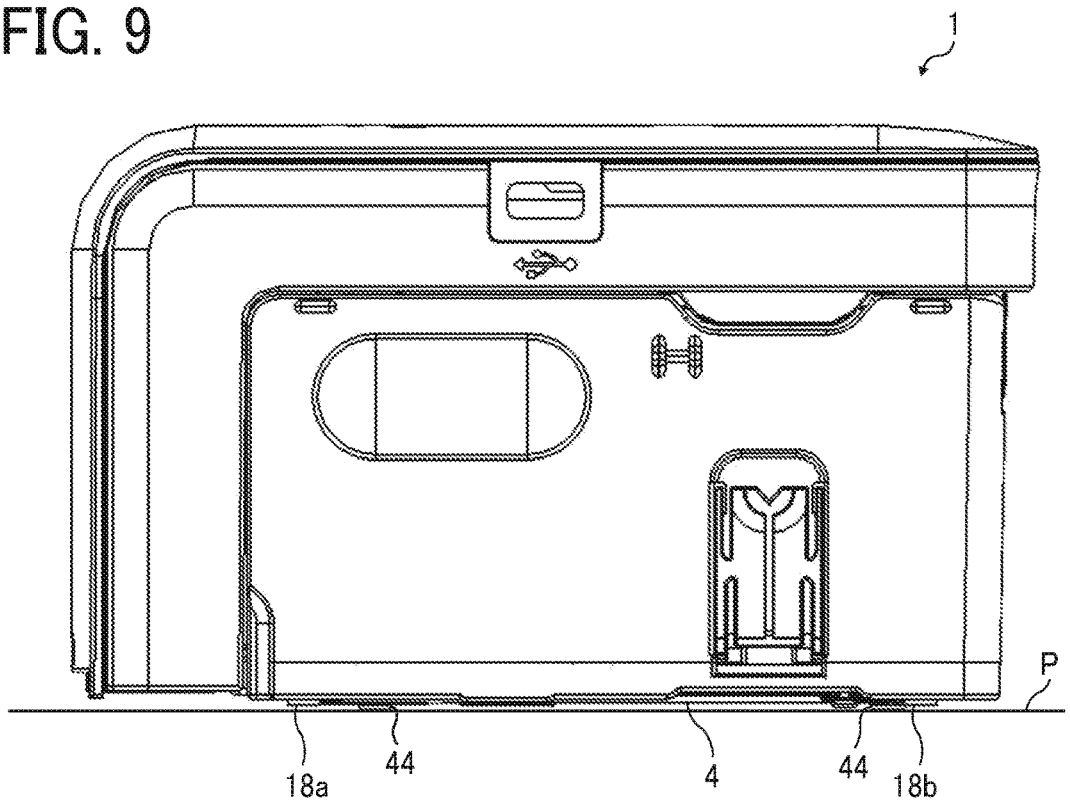
FIG. 9 is a right side view of the printer body being a roller contactless state in which the printer body to which the spacer is attached is moved for scanning with rollers kept contactless with the recording medium or the table on which the recording medium is placed.

When the spacer 4 is removed from the printer body 1, the handheld printer 10 can be used in the roller contact state in which the printer body 1 is moved for scanning with the rollers 17a, 17b, 18a, and 18b of the printer body 1 in contact with and rolling on the surface of the recording medium P as illustrated in FIG. 8. As a result, owing to straight traveling performance of the rollers 17a, 17b, 18a, and 18b, the user can easily move the printer body 1 straight along the scanning direction and can form an appropriate image. On the other hand, when the spacer 4 is attached to the recording side 30 of the printer body 1, the handheld printer 10 can be used in the roller contactless state in which the printer body 1 is moved for scanning with the rollers 17a, 17b, 18a, and 18b of the printer body 1 contactless with the surface of the recording medium P and the like as illustrated in FIG. 9.

The spacer 4 is attached to and detached from the recording side 30 of the lower unit 3 with magnets. Specifically, the spacer 4 includes magnets 42, and screw heads 39a of metal screws that are two magnetic bodies are exposed to the recording side 30. The magnets 42 are disposed to oppose the screw heads 39a when the spacer 4 is attached to the recording side 30 of the printer body 1. In the present embodiment, the magnetic body provided on the spacer 4 is described as an example of a fastening member such as a metal screw, but may be a frame member such as a metal frame of the spacer 4. Such a frame member is usually made of metal in order to secure rigidity and can be used as a magnetic body.

Further, as illustrated in FIG. 3, in order to align the recording side 30 of the lower unit 3 with the spacer 4, an alignment projection 39b and an alignment hole 39c are formed on the recording side 30. On the spacer 4, an alignment hole 43 where the alignment projection 39b fits and an alignment projection which fits in the alignment hole 39c are formed at respective corresponding positions. When the spacer 4 is properly aligned with the recording side 30 such that the alignment projection and the alignment hole fit in and around the alignment hole and alignment projection on the other side, the magnets 42 on the spacer 4 face the screw heads 39a of the recording side 30. Then, as illustrated in FIG. 10, the spacer 4 is mounted and held onto the recording side 30 by the magnetic force of the magnets 42.

The body of the spacer 4 is made of resin such as ABS resin. Three projections 44 to support the printer body 1 are provided on a recording medium opposing side) of the spacer 4, which is opposite the side facing the recording side 30 when the spacer 4 is attached to the printer body 1. In the state in which the spacer 4 is mounted on the recording side 30 of the printer body 1, as illustrated in FIG. 9, the tips of the projections 44 are farther from the recording side 30 than the rollers 17a, 17b, 18a, and 18b in the direction in which the recording side 30 faces the recording medium P. Therefore, when the printer body 1 to which the spacer 4 is attached is placed on the recording medium P, the tips of the projections 44 contact the recording side 30 to float the rollers 17a, 17b, 18a, and 18b from the surface of the recording medium P. Then, the handheld printer 10 is in the roller contactless state.

To use the handheld printer 10 in the roller contactless state, the user holds the printer body 1 and places the printer body 1 on the recording medium P so that the recording side 30 to which the spacer 4 is attached opposes the surface of the recording medium P. At that time, the printer body 1 is supported at three points by the projections 44 of the spacer 4 so that the rollers 17a, 17b, 18a, and 18b float from the surface of the recording medium P. Then, the user can move the printer body 1 (manual scanning) so that the three projections 44 slide on the surface of the recording medium P, to form an image on the recording medium P.

Figure 11:
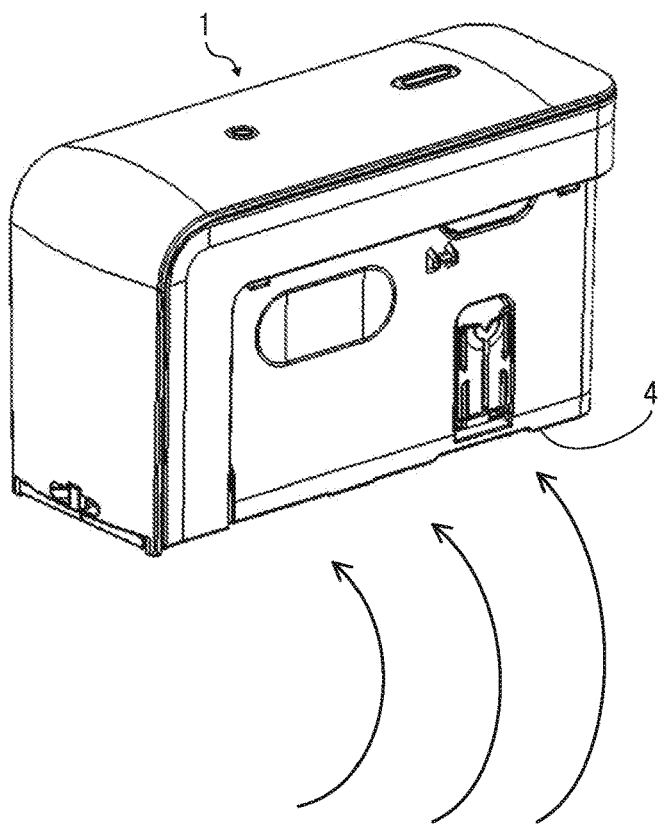
FIG. 11 is a schematic view illustrating the printer body being moved along a curved track in a roller contactless state.

FIG. 11 is a perspective view illustrating the printer body 1 being moved along a curved track in the roller contactless state.

In the roller contactless state, since the rollers 17a, 17b, 18a, and 18b float from the surface of the recording medium P, an operation of moving the printer body 1 (manual operation) in a direction different from the scanning direction (X-axis direction) is not disturbed by the rollers 17a, 17b, 18a, and 18b. Therefore, the curved traveling performance of the printer body 1 is improved compared to the roller contact state. As a result, the printer body 1 can be easily moved along the curved track.

In addition, in a case where, after recording of the first line in the scanning direction, recording of the second line is performed at a position different in the scanning orthogonal direction, the rollers 17a, 17b, 18a, and 18b do not disturb the line feed operation to move the printer body 1 in the scanning orthogonal direction with the recording side 30 kept facing the recording medium. Therefore, the operability of the line feed operation is improved compared to the roller contact state. In the roller contactless state, since the straight traveling performance by the rollers 17a, 17b, 18a, and 18b is not feasible, the user needs to move the printer body 1 straight in the scanning direction without assistance from the rollers 17a, 17b, 18a, and 18b.

Each of the three projections 44 of the spacer 4 is disposed out of the range of the recording portion (where the plurality of discharge nozzles 41 are located) of the inkjet head 40 in the direction (Y-axis direction) orthogonal to the scanning direction. Thus, the image can be protected from being disturbed by the projections 44 rubbing against the image portion immediately after formed during image formation in the roller contactless state.

Next, descriptions are given below of the cover 8 of the handheld printer 10 according to the present embodiment.

The cover 8 according to the present embodiment is mountable to the printer body 1 in a state in which the spacer 4 mounted to the printer body 1 is accommodated in the cover 8. As illustrated in FIG. 2, the cover 8 according to the present embodiment includes a bottom board 80 on which the printer body 1 is placed and three walls 82, 83, and 84 extending, in the Z-axis direction in the drawings, from the top surface of the bottom board 80. In a state in which the printer body 1 is placed on the bottom board 80, the three walls 82, 83, and 84 respectively face the left side 32, the right side 33, and the rear side 34 of the narrow portion 37 in the lower unit 3 of the printer body 1.

In the present embodiment, for example, the cover 8 is attached to the printer body 1 in the following method. The printer body 1 is inserted, from the upper side (Z-axis direction) in the drawing, into the cover 8 placed on the table as illustrated in FIG. 2 so that the narrow portion 37 of the lower unit 3 of the printer body 1 fits in the space surrounded by three walls 82, 83, and 84. Then, the two projections 16 of the printer body 1 are respectively hooked, by snap-fit, on the two recesses 81 on the inner faces of the left and right walls 82 and 83 of the cover 8. As a result, the cover 8 is kept attached to the printer body 1.

Figure 12:
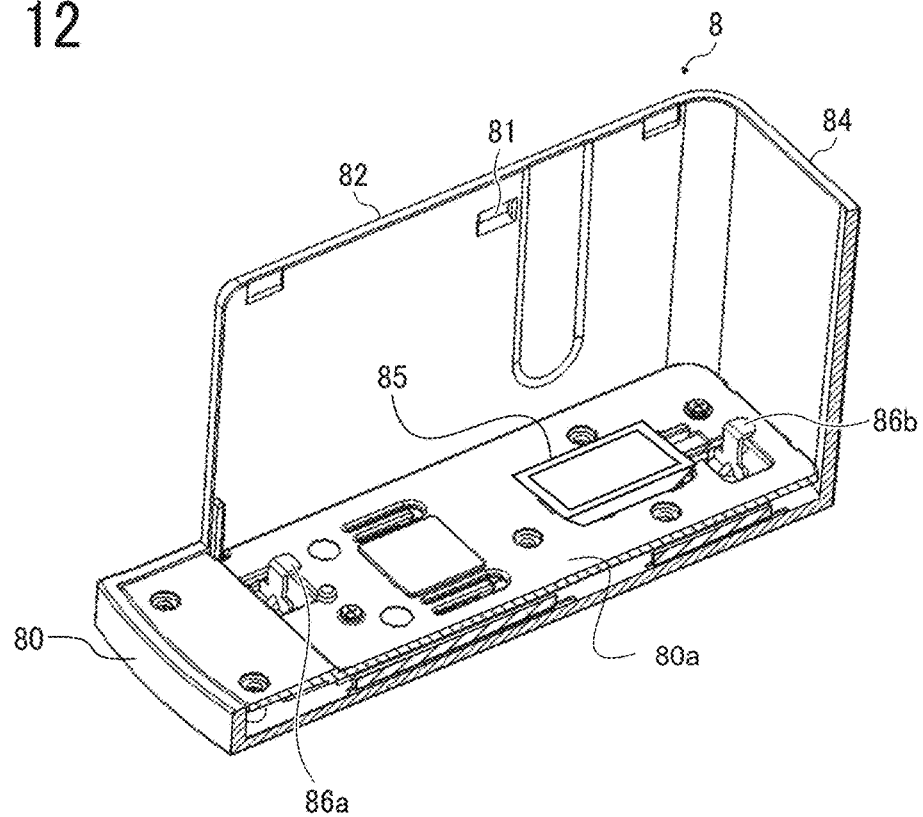
FIG. 12 is a perspective view in which a right wall of the cover is removed to illustrate an interior of the cover.

FIG. 12 is a perspective view in which the right wall 83 is removed to illustrate an interior of the cover 8.

The cover 8 according to the present embodiment includes a cap portion 85 as a protector to protect the recording portion (a plurality of discharge nozzles 41) of the inkjet head 40. The plurality of discharge nozzles 41 serve as the image forming device. In a state in which the cover 8 is attached to the printer body 1, the cap portion 85 is in tight contact with the recording portion of the inkjet head 40 exposed on the recording side 30 of the printer body 1, to cover the plurality of discharge nozzles 41 in the recording portion. With this configuration, in a state in which the cover 8 is attached to the printer body 1, the discharge nozzles 41 of the printer body 1 are sealed in the cap portion 85. Thus, the discharge nozzles 41 are protected, and moisture therein is retained.

In the present embodiment, the handheld printer 10 is provided with an attachment switching device to perform switching of a support state of the spacer 4 (an attachment) between an attached state (a first state) attachable to the printer body 1 and a separate state (a second state) removable from the printer body 1 in conjunction with removal of the cover 8 from the printer body 1. In one example, the attachment switching device is a slide lock member 86. The attachment switching device according to the present embodiment is provided in the cover 8 and performs switching whether the spacer 4 is retained on the printer body 1 (not held by the cover 8) and retention on the printer body 1 is canceled (the spacer 4 is held by the cover 8).

Figure 13:
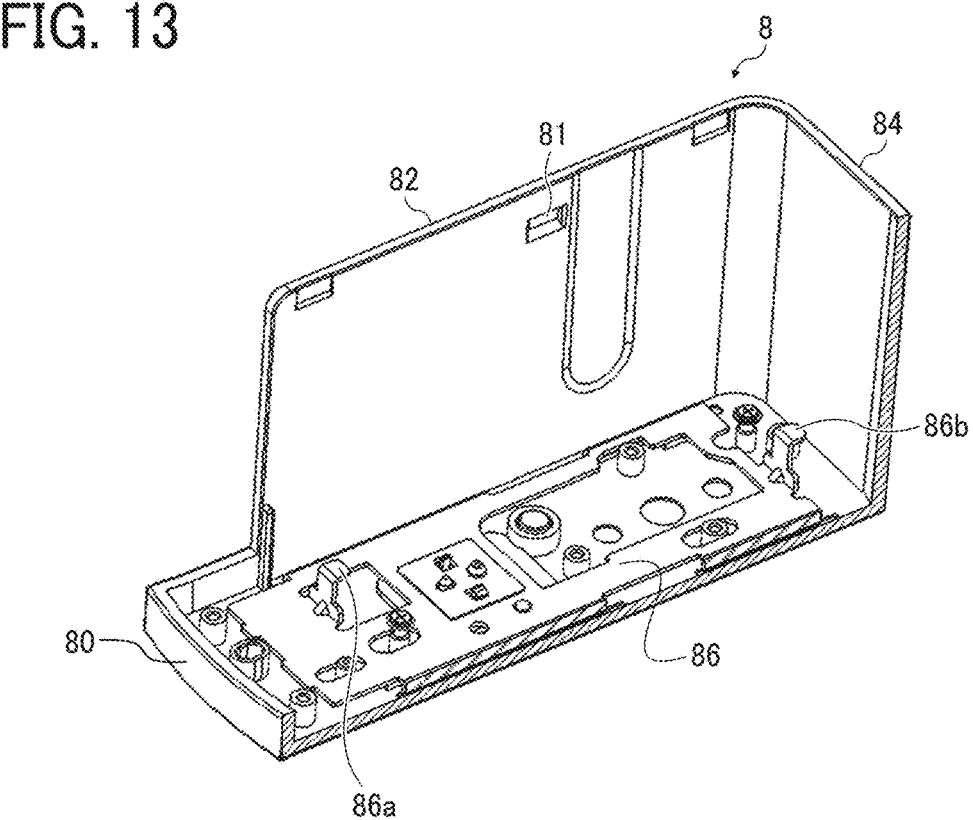
FIG. 13 is a perspective view of the cover in which an upper bottom plate of a bottom board of the cover, in addition to the right wall of the cover, are removed to expose a slide lock member according to an embodiment.

FIG. 13 is a perspective view of the cover 8 in which the right wall 83 is removed to illustrate the interior of the cover 8 and an upper bottom plate 80a on the top of the bottom board 80 is removed to expose a slide lock member 86.

Figure 14:
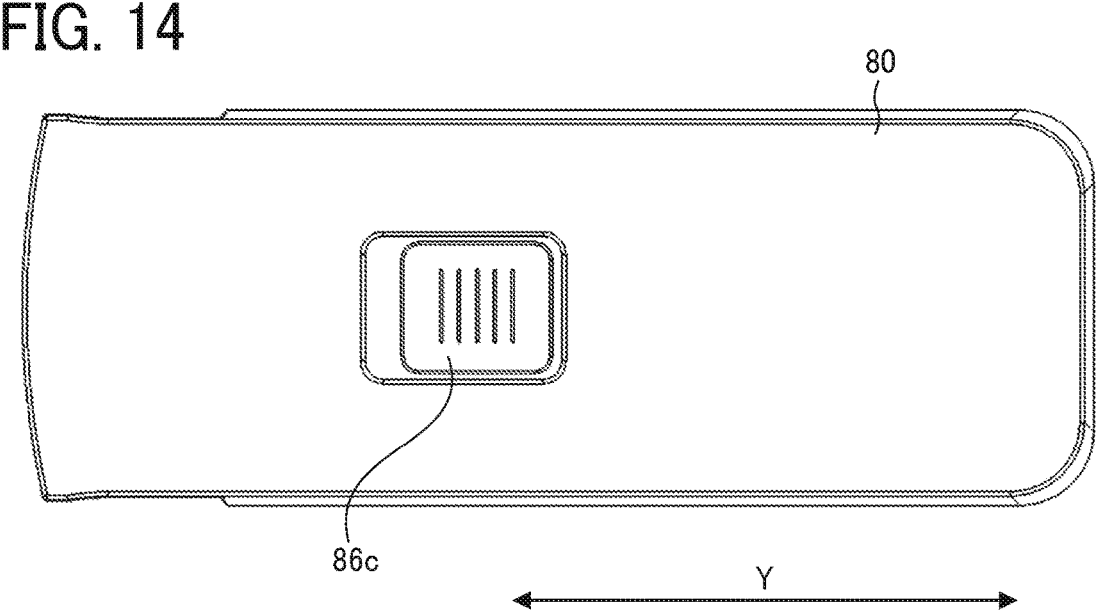
FIG. 14 is a bottom view of the cover.

In the present embodiment, the slide lock member 86 is configured to slide on the bottom board 80 along the direction (Y-axis direction) orthogonal to the scanning direction. Specifically, as illustrated in FIG. 14, on the lower face of the bottom board 80 of the cover 8, a slide operation portion 86c secured to the slide lock member 86 is exposed. As the user slides the slide operation portion 86c along the Y-axis direction in the drawings, the slide lock member 86 slides in conjunction with sliding of the slide operation portion 86c.

Figure 15A:
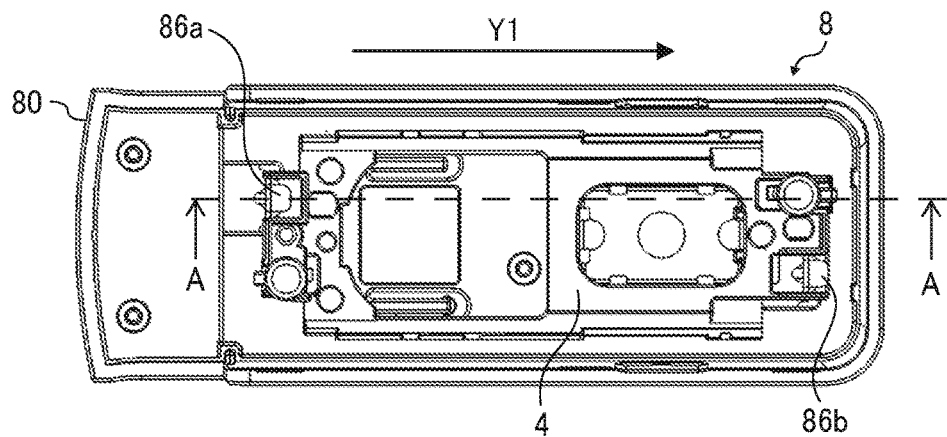
FIG. 15A is a top view of the cover in a state in which only the spacer is placed on the bottom board of the cover and the printer body is not mounted thereon.
Figure 15B:
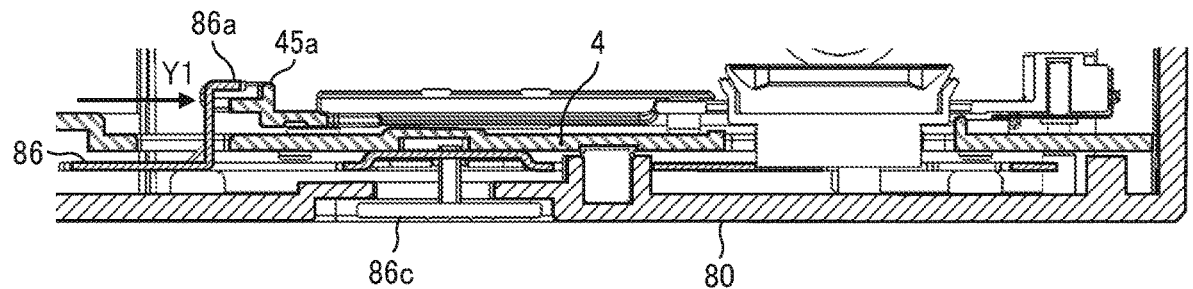
FIG. 15B is a cross-sectional view taken along line A-A in FIG. 15A.

FIG. 15A is a top view of the cover 8 in a state in which only the spacer 4 is placed on the bottom board 80 of the cover 8 and the printer body 1 is not mounted thereon. FIG. 15B is a cross-sectional view taken along line A-A in FIG. 15A. FIGS. 15A and 15B illustrate the state in which the spacer 4 is held by the cover 8 (i.e., in the separate state).

As the user slides the slide operation portion 86c in the direction indicated by arrow Y1 in FIGS. 15A and 15B, the slide lock member 86 slides in the direction indicated by arrow Y1 in conjunction with sliding of the slide operation portion 86c. The slide lock member 86 includes lock portions 86a and 86b as engagement portions to engage the locked portions 45a and 45b as engaged portions of the spacer 4.

As the slide lock member 86 slides in the direction indicated by arrow Y1 in the drawing, as illustrated in FIG. 15B, an end of the lock portion 86a on the slide lock member 86 is positioned above the locked portion 45a of the spacer 4. Similarly, an end of the lock portion 86b is positioned above the locked portion 45b. Here, the spacer 4 is attached to the printer body 1 with the magnetic force. With this configuration, when the user pulls out the printer body 1 from the cover 8 in the Z-axis direction in order to remove the printer body 1 from the cover 8, the locked portions 45a and 45b of the spacer 4 are caught on the ends of the lock portions 86a and 86b of the slide lock member 86 of the cover 8 and prevented from following the printer body 1 being pulled. This is a lock state (engaged state) in which the slide lock member 86 locks the spacer 4.

As a result, when the printer body 1 is pulled out of the cover 8, the spacer 4 is held on the cover 8 side. In other words, retention of the spacer 4 (the attachment) on the cover 8 is on. Therefore, to use the handheld printer 10 with the rollers (in the roller contact state), as illustrated in FIGS. 15A and 15B, the user can obtain, with the sliding operation in the direction indicated by arrow Y1, the printer body 1 from which the spacer 4 is removed when the printer body 1 is pulled out. Then, the user can perform image formation in that state.

Figure 16A:
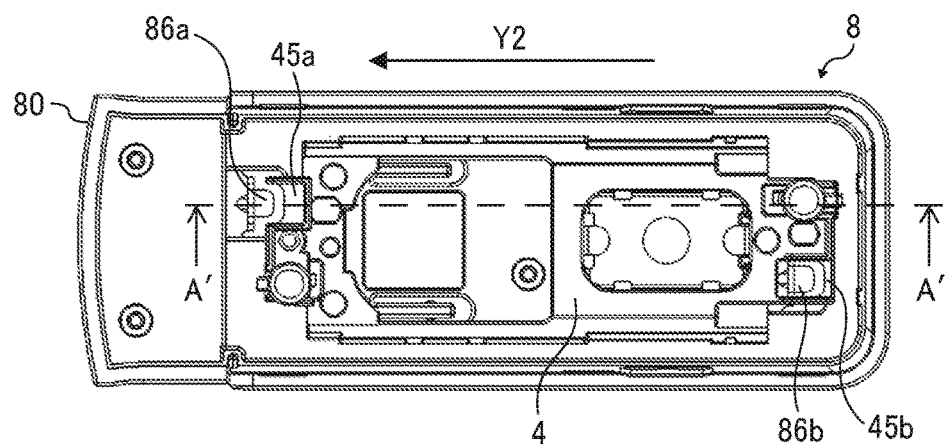
FIG. 16A is a top view of the cover in a state in which only the spacer is placed on the bottom board of the cover and the printer body is not mounted thereon.
Figure 16B:
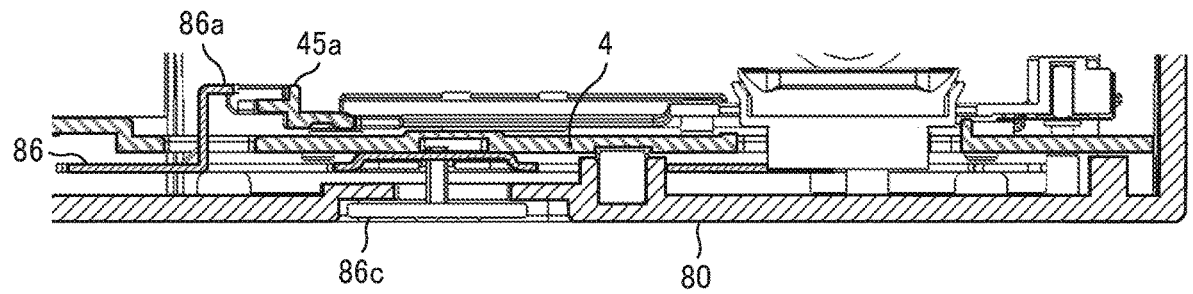
FIG. 16B is a cross-sectional view taken along line A'-A' in FIG. 16A.

FIG. 16A is a top view of the cover 8 in a state in which only the spacer 4 is placed on the bottom board 80 of the cover 8 and the printer body 1 is not mounted thereon. FIG. 16B is a cross-sectional view taken along line A'-A' in FIG. 16A. FIGS. 16A and 16B illustrate the state in which the spacer 4 is held on the printer body 1 (the spacer is not held on the cover 8).

When the user slides the slide operation portion 86c in the direction indicated by arrow Y2 in FIGS. 16A and 16B, the slide lock member 86 slides in the direction indicated by arrow Y2 in the drawing in conjunction with sliding of the slide operation portion 86c. As the slide lock member 86 slides in the direction indicated by arrow Y2 in the drawing, as illustrated in FIG. 16B, the end of the lock portion 86a on the slide lock member 86 is withdrawn from above the locked portion 45a of the spacer 4. The lock portion 86b is withdrawn similarly.

Thus, the locked portions 45a and 45b of the spacer 4 are released from the ends of the lock portions 86a and 86b of the slide lock member 86 of the cover 8. That is, the spacer 4 is in an unlocked state (disengaged state) in which the slide lock member 86 releases the spacer 4. Accordingly, as the user pulls out the printer body 1 from the cover 8 in the Z-axis direction in order to remove the cover 8 from the printer body 1, the spacer 4 is pulled out from the cover 8 in a state held by the printer body 1 by the magnetic force. As a result, when the printer body 1 is pulled out from the cover 8, the spacer 4 is kept attached to the recording side 30 of the printer body 1 by the magnetic force. In other words, retention of the spacer 4 (the attachment) on the cover 8 is on.

Therefore, when the user uses the handheld printer 10 without the rollers (roller contactless state), as illustrated in FIGS. 16A and 16B, the user can obtain, with the sliding operation in the direction indicated by arrow Y2, the printer body 1 with the spacer 4 attached thereto when the printer body 1 is pulled out. Then, the user can perform image formation in that state.

The cover 8 includes a magnetic body at a position opposite the magnet of the spacer 4 so that the spacer 4 is held by the cover 8 by the magnetic force. This configuration can make the spacer 4 less easily removable from the cover 8 even when the user slides the slide operation portion 86c in the direction indicated by arrow Y2 in the drawing, to change the locked state of the spacer 4 illustrated in FIGS. 15A and 15B to the unlocked state illustrated in FIGS. 16A and 16B, in the state in which the printer body 1 is not mounted on the cover 8. This configuration can prevent the spacer 4 from falling from the cover 8 when the side of the cover 8 from which the printer body 1 is inserted is turned down. Further, in a state in which the spacer 4 and the cover 8 are attached to the printer body 1 in the unlocked state illustrated in FIGS. 16A and 16B, the magnetic force between the printer body 1 and the spacer 4 is stronger than the magnetic force between the cover 8 and the spacer 4. Accordingly, when the printer body 1 is removed from the cover 8 in the state illustrated in FIGS. 16A and 16B, the spacer 4 is kept attached to the printer body 1 and removed from the cover 8.

Variation

Next, a description is given below of a variation of the structure to hold the spacer 4 to the cover 8 according to the above-described embodiment.

Figure 17:
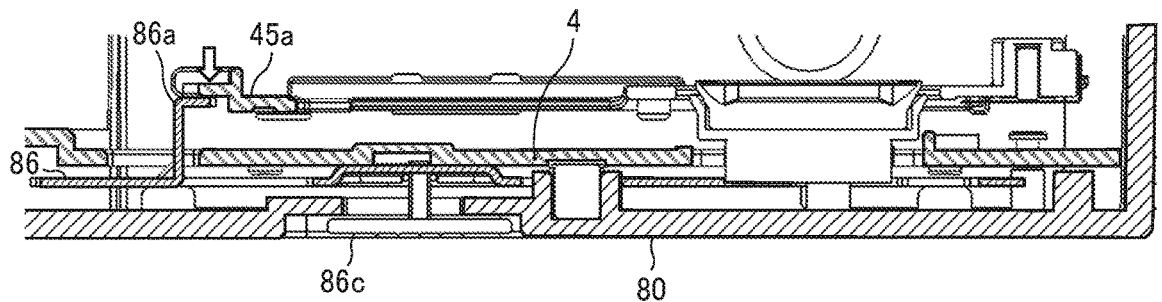
FIG. 17 is a cross-sectional view illustrating a state in which a locked portion of the spacer attached to the printer body contacts an end of a lock portion on the slide lock member, and the locked portion inhibits mounting of the printer body into the cover.

In the embodiment described above, when the printer body 1 with the spacer 4 attached thereto is mounted in the cover 8, the lock portion 86a of the cover 8 may be in a locked state (engaged state). In this case, as illustrated in FIG. 17, the locked portion 45a of the spacer 4 attached to the printer body 1 may abut against the end of the lock portion 86a on the slide lock member 86, thus inhibiting the printer body 1 from being mounted in the cover 8. In this case, the user needs to slide the slide operation portion 86c in the direction indicated by arrow Y2 to bring the spacer 4 into the unlocked state (disengaged state) and again perform attaching of the printer body 1 to the cover 8.

Figure 18A:
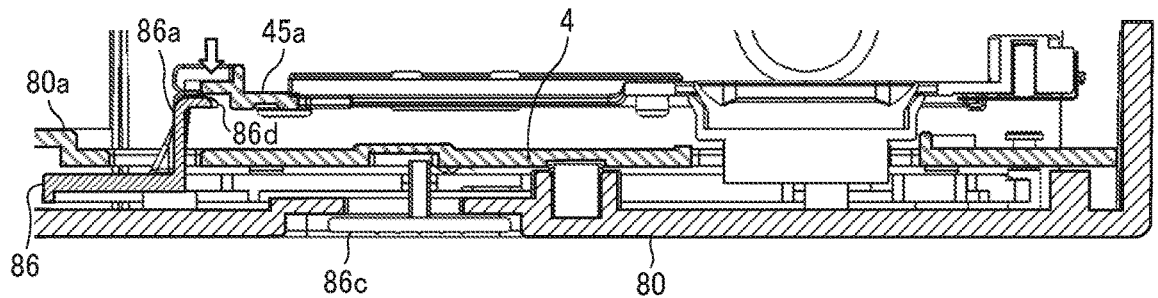
FIGS. 18A to 18C are cross-sectional views illustrating a cover according to a variation.
Figure 18B:
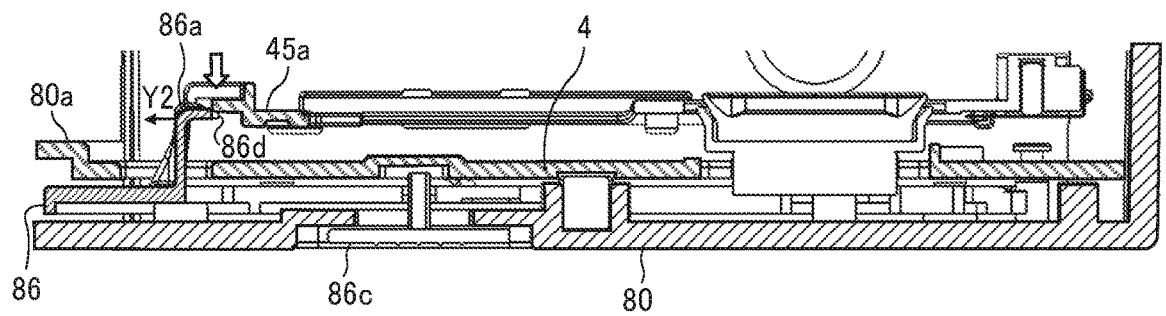
Figure 18C:
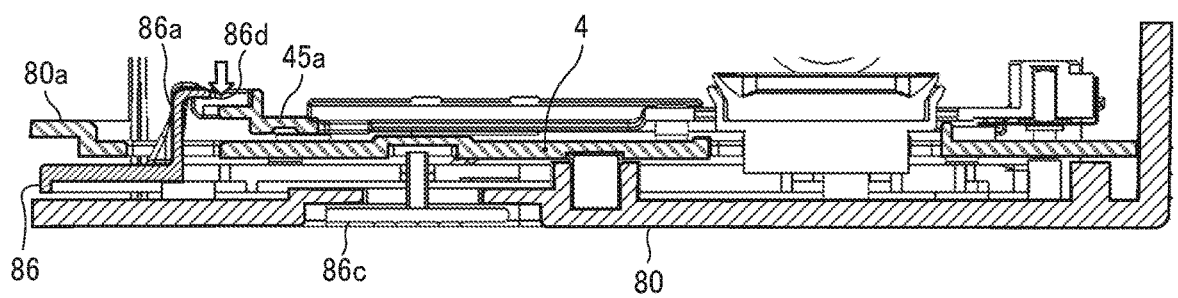

FIGS. 18A to 18C are cross-sectional views illustrating a configuration of the cover 8 according to the present variation.

In present variation, the upper side of an end portion of the lock portion 86a on the slide lock member 86 is tapered. That is, the lock portion 86a includes a tapered portion 86d inclined downward toward the tip. In the present modification, in a state in which the lock portion 86a in the cover 8 is in the locked state (engaged state), when the printer body 1 with the spacer 4 attached thereto is attached to the cover 8, the following occurs.

First, as illustrated in FIG. 18A, the locked portion 45a of the spacer 4 abuts on the upper side of the end portion of the lock portion 86a, that is, the tapered portion 86d, on the slide lock member 86 of the cover 8. At this time, owing to the tapered upper side of the end portion (the tapered portion 86d) of the lock portion 86a, as the locked portion 45a is pushed downward, the locked portion 45a slides on the upper side of the lock portion 86a as illustrated in FIG. 18B. Simultaneously, the locked portion 45a is pushed in the direction indicated by arrow Y2. As a result, the lock portion 86a is moved to a position to release the locked portion 45a and becomes the unlock state (disengaged state). As the locked portion 45a is further pushed downward, as illustrated in FIG. 18C, the locked portion 45a can move down beyond the lock portion 86a.

Therefore, according to present variation, the user does not need to perform a special operation when mounting the printer body 1 with the spacer 4 attached thereto to the cover 8 in which the lock portion 86a is in the locked state (engaged state).

Note that, although the description above concerns an example in which the tapered portion mentioned above is disposed in the lock portion 86a, alternatively, the tapered portion can be disposed in the locked portion 45a.

As described above, in the handheld printer 10 according to the embodiment described above, attaching and removing the spacer 4 to and from the printer body 1 can switch the state of the handheld printer 10 between: the roller contact state in which the image formation is performed using the rollers 17a, 17b, 18a, and 18b; and the roller contactless state in which image formation is performed without using the rollers 17a, 17b, 18a, and 18b. However, the states of the handheld printer 10 switched by the attaching and removal of the spacer 4 serving as the attachment are not limited thereto and include any state switched by the attaching and removal of the attachment to the printer body 1.

Further, in the present embodiment, the printer body 1 includes the rollers 17a, 17b, 18a, and 18b, but the spacer 4 can includes the rollers 17a, 17b, 18a, and 18b. In this case, attaching the spacer 4 to the printer body 1 attains the roller contact state, and removing the spacer 4 from the printer body 1 attains the roller contactless state.

Further, in the present embodiment, the cover 8 includes the attachment switching device to perform switching of the support state of the spacer 4 between the attached state (in which the spacer 4 can be attached to the printer body 1) and the separate state removable from the printer body 1 in conjunction with removal of the cover 8 from the printer body 1. Alternatively, the attachment switching device can be provided in the printer body 1 or the spacer 4. For example, the spacer 4 is attached to and removed from the printer body 1 by an electromagnet controlled to turn on and off the magnetic force thereof. The attached state is attained with the electromagnet turned on, and the separate state removable from the printer body 1 is attained with the electromagnet turned off. In this case, when the electromagnet is on (the attached state), the printer body 1 can be pulled out from the cover 8 together with the spacer 4 magnetically attached to the printer body 1. When the electromagnet is off (the separate state), only the printer body 1 can be pulled out from the cover while the spacer 4 is left on the cover 8 due to the own weight.

Although descriptions have been made above of the examples in which aspects of the present disclosure are applied to the inkjet handheld printer 10, the aspects of the present disclosure can also be applied to other types of image forming apparatuses. The aspects of the present disclosure can be applied to a recording apparatus of, for example, thermal type or thermal-transfer type. A body of a thermal-transfer type recording apparatus includes an ink ribbon as a container to store liquid. Accordingly, a recess can be formed at the bottom of the ink ribbon, and a position sensor to detect the recording medium can be disposed in a space formed by the recess.

Embodiments of the present invention provides respective effects as follows.

Aspect 1

Aspect 1 concerns a mobile image forming apparatus (for example, the handheld printer 10) that includes a body (for example, the printer body 1) and an attachment (for example, the spacer 4) to be removably attached to the body. Attaching and removing of the attachment to and from the body switches a state in use of the mobile image forming apparatus. The mobile image forming apparatus further includes a cover (for example, the cover 8) to be attached to the body in a state covering the attachment attached to the body.

According to this aspect, the mobile image forming apparatus can be used in a plurality of different states in use by the attaching and removing the attachment. In the state in which the attachment is not used, the body is used with attachment removed therefrom. Accordingly, the operability and handling of the mobile image forming apparatus are not degraded by an unnecessary attachment component.

On the other hand, in such a mobile image forming apparatus, it is also necessary to consider the easiness of handling of the attachment to be removably attached to the body.

Therefore, in this aspect, the cover as a part of the mobile image forming apparatus to cover the body is configured to be attachable to the body in a state in which the attachment attached to the body is accommodated. As a result, in the state using the attachment, by simply removing the cover from the body, the user can obtain the body from which the attachment is removed so that the user can start image formation immediately.

Aspect 2

According to Aspect 2, in Aspect 1, the attachment is attached to and removed from a side of the body opposed to the recording medium in formation of an image on the recording medium.

According to this aspect, the aspect can be applied to the attachment that is removably attached to the side of the body opposed to the recording medium.

Aspect 3

According to Aspect 3, in Aspect 1 or 2, the states in use includes: a roller contact state in which the body is moved for scanning with a roller (for example, the roller 17a, 17b, 18a, or 18b) rolling on a surface of the recording medium or a table on which the recording medium is placed; and a roller contactless state in which the roller is kept contactless with the recording medium while the body is moved for scanning.

According to this aspect, by switching the state of the body to the roller contact state, image formation can be performed in a state in which the straight traveling performance by the roller is enhanced. Additionally, by switching to the roller contactless state, the roller is prevented from hindering curved scanning or line feed operation, and image formation can be performed in a state in which the curved traveling performance and the operability of line feed are enhanced.

Aspect 4

According to Aspect 4, in Aspect 3, the body includes the roller, and the attachment is a spacer (for example, the spacer 4) interposed between the body and the surface of the recording medium to float the roller from the recording medium.

According to this aspect, when the mobile image forming apparatus is used in the roller contact state, image formation can be performed using the body from which the spacer as the attachment is removed. Therefore, the attachment does not impair the operability and the ease of handling of the mobile image forming apparatus in the roller contact state.

Aspect 5

According to Aspect 5, the mobile image forming apparatus according to any one of Aspects 1 to 4 further includes an attachment switching device (for example, the slide lock member 86) to perform switching between a support state of the attachment in conjunction with attaching and removing of the cover to and from the body. The support state is switched between an attached state in which the attachment is attached to the body and a separate state in which the attachment is removable from the body.

According to this aspect, the user can operate the attachment switching device to switch the support state of the attachment to the attached state and then remove the cover from the body, thereby obtaining the body with the attachment is attached thereto. Additionally, the user can operate the attachment switching device to switch the state of the attachment to the separate state and then remove the cover from the body, thereby obtaining the body from which the attachment is removed. Therefore, as the cover is removed from the body, the mobile image forming apparatus in a desired state for use can be obtained, and the image formation can be performed as is.

In addition, since the attachment remains on the cover when the apparatus is used without the attachment, the attachment can be stored together with the cover, and the user can easily manage the body, the attachment, and the cover.

Aspect 6

According to Aspect 6, in Aspect 5, the attachment switching device is provided on the cover.

According to this aspect, since there is no need for providing the attachment switching device on the body side, the size and the weight of the apparatus body can be reduced.

Aspect 7

According to Aspect 7, in Aspect 6, the attachment switching device performs switching of whether or not the cover holds the attachment, thereby performing the switching between the attached state and the separate state in conjunction with removal of the cover from the body.

According to this aspect, the attachment switching device provided on the cover can be attained with a simple configuration.

Aspect 8

According to Aspect 8, in Aspect 7, the attachment switching device includes a second engagement portion (for example, the lock portions 86a and 86b) disposed in the cover, and the attachment includes a first engagement portion (for example, the locked portions 45a and 45b). The second engagement portion disposed in the cover engages with the first engagement portion of the attachment being accommodated in the cover, thereby causing the attachment to be held by the cover. When the second engagement portion disposed in the cover is disengaged from the first engagement portion of the attachment, the attachment is retained by the cover.

According to this aspect, the attachment switching device provided on the cover can be attained with a simple configuration.

Aspect 9

According to Aspect 9, in Aspect 8, the second engagement portion is configured to move to an engagement position to engage with the first engagement portion and a disengaged position to be disengaged from the first engagement portion. The second engagement portion is configured to contact the first engagement portion, thereby moving to the disengaged position, in conjunction with attaching of the cover to the body in the state in which the second engagement portion is positioned at the engagement position.

This configuration can attain the following effect even when the second engagement portion is positioned at the disengaged position before the cover is attached to the body. That is, in response to the contact of the first engagement portion (of the attachment) on the side of the body with the second engagement portion of the cover, the second engagement portion moves to the disengaged position. Therefore, even when the second engagement portion is located at the disengaged position, the second engagement portion can be set to the disengaged position, and the cover can be properly attached to the body.

Aspect 10

According to Aspect 10, Aspect 8 or 9, the cover includes a plurality of second engagement portions configured to move in conjunction with each other between the engagement position and the disengaged position.

According to this aspect, the strength with which the attachment is held to the cover can be enhanced.

Aspect 11

In Aspect 11, according to any one of Aspects 1 to 10, the cover incudes a protector (for example, a cap portion 85) to protect the image forming device (for example, the recording portion or the discharge nozzles 41 of the inkjet head 40) to form an image on the recording medium.

According to this aspect, the image forming device can be protected with the cover.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An image forming apparatus comprising:
a printer body;
an image forming device configured to form an image on a recording medium, the image forming device supported by the printer body;
a roller configured to selectively guide the printer body in scanning when the image forming apparatus is in a roller contact state;
a spacer configured to be removably attached to the printer body, the spacer configured to switch the image forming apparatus from the roller contact state to a roller contactless state by attaching to the printer body; and
a cover configured to selectively dock the printer body therein.

2. The image forming apparatus according to claim 1, wherein the spacer is attached to and removed from a side of the printer body opposed to the recording medium in formation of an image on the recording medium.

3. The image forming apparatus according to claim 1, wherein
in the roller contact state the printer body is movable for scanning while the roller rolls on a surface of one of the recording medium and a table on which the recording medium is placed; and
in the roller contactless state the printer body is movable for scanning while the roller is contactless with the surface.

4. The image forming apparatus according to claim 3, wherein the roller is supported on the printer body, and
wherein the spacer is selectively interposed between the printer body and the surface to float the roller from the surface.

5. The image forming apparatus according to claim 1, further comprising:
an attachment switching device configured to perform switching of a support state of the spacer when the cover is attached to the printer body or when the cover is removed from the printer body,
wherein the support state is switched between an attached state in which the spacer is attached to the printer body and a separate state in which the spacer is removable from the printer body.

6. The image forming apparatus according to claim 5, wherein the attachment switching device is disposed in the cover.

7. The image forming apparatus according to claim 6,
wherein the attachment switching device is configured to turn on and off retention of the spacer on the cover, and
wherein the attached state and the separate state are switched in conjunction with removing of the cover from the printer body.

8. The image forming apparatus according to claim 7, wherein the attachment switching device includes: a first engaged portion disposed in the spacer, and a second engagement portion disposed in the cover and configured to engage with the first engaged portion disposed in the spacer, and wherein
the spacer is retained on the cover with engagement between the second engagement portion and the first engagement portion in the spacer being accommodated in the cover, and
the retention of the spacer on the cover is canceled with disengagement of the second engagement portion from the first engagement portion.

9. The image forming apparatus according to claim 8,
wherein the second engagement portion is configured to move to an engagement position to engage with the first engagement portion and a disengaged position to be disengaged from the first engagement portion, and
wherein the second engagement portion is configured to move to the disengaged position by contact with the first engagement portion when the cover is attached to the printer body with the second engagement portion set at the engagement position.

10. The image forming apparatus according to claim 8,
wherein the attachment includes a plurality of first engagement portions including the first engagement portion,
wherein the cover includes a plurality of second engagement portions including the second engagement portion, the plurality of second engagement portions configured to engage, respectively, with the plurality of first engagement portions of the spacer being accommodated in the cover, each of the plurality of second engagement portions configured to move in conjunction with each other between an engagement position to engage corresponding one of the plurality of first engagement portions and a disengaged position to be disengaged from the corresponding one of the plurality of the first engagement portions.

11. The image forming apparatus according to claim 1, wherein the cover includes a protector configured to protect the image forming device.

12. The image forming apparatus according to claim 1, wherein in the roller contactless state, the spacer is interposed between the printer body and the recording medium such that the roller does not contact the recording medium.

13. The image forming apparatus according to claim 1, wherein the cover is configured to have the printer body docked therein, such that, when the printer body is undocked from the cover, the spacer selectively remains attached to the cover when the image forming apparatus in the roller contact state.

14. An image forming apparatus comprising:
a body;
an image forming device configured to form an image on a recording medium, the image forming device supported by the body;
an attachment configured to be removably attached to the body, the attachment configured to switch a state in use of the image forming apparatus by attaching and removing the attachment to and from the body;
a cover configured to be removably attached to the body, the cover configured to cover the attachment attached to the body; and
a roller configured to selectively guide the body in scanning, wherein the state in use includes:
a roller contact state in which the body is movable for scanning while the roller rolls on a surface of one of the recording medium and a table on which the recording medium is placed; and
a roller contactless state in which the body is movable for scanning while the roller is contactless with the surface.

15. An image forming apparatus comprising:
a body;
an image forming device configured to form an image on a recording medium, the image forming device supported by the body;
an attachment configured to be removably attached to the body, the attachment configured to switch a state in use of the image forming apparatus by attaching and removing the attachment to and from the body;
a cover configured to be removably attached to the body, the cover configured to cover the attachment attached to the body; and
an attachment switching device configured to turn on and off retention of the attachment on the cover, the attachment switching device including: a first engaged portion disposed in the attachment and a second engagement portion disposed in the cover and configured to engage with the first engaged portion disposed in the attachment, and wherein
the attachment is retained on the cover with engagement between the second engagement portion and the first engagement portion in the attachment being accommodated in the cover, and
the retention of the attachment on the cover is canceled with disengagement of the second engagement portion from the first engagement portion.

* * * * *